(12) United States Patent
Lancioni et al.

(10) Patent No.: US 7,895,988 B2
(45) Date of Patent: *Mar. 1, 2011

(54) LOCK COUPLING BETWEEN TWO MECHANICAL COMPONENTS

(75) Inventors: Federico Lancioni, Sangemini (IT); Michele Pecora, Potenza (IT); Stefano Fornara, Modena (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 722 days.

This patent is subject to a terminal disclaimer.

(21) Appl. No.: 11/906,915

(22) Filed: Oct. 4, 2007

(65) Prior Publication Data

US 2008/0150278 A1 Jun. 26, 2008

(30) Foreign Application Priority Data

Oct. 5, 2006 (EP) .................................. 06425679

(51) Int. Cl.
*F02D 9/08* (2006.01)
(52) U.S. Cl. ................... 123/337; 123/306; 123/184.56
(58) Field of Classification Search ................. 123/306, 123/337, 184.56, 432; 251/305, 286, 288; 285/76, 79, 88, 376
See application file for complete search history.

(56) References Cited

U.S. PATENT DOCUMENTS

| 5,301,985 | A |  | 4/1994 | Terzini ........................ 285/79 |
| 5,715,782 | A |  | 2/1998 | Elder ..................... 123/184.61 |
| 5,797,589 | A | * | 8/1998 | Kalebjian et al. ............ 251/305 |
| 6,302,617 | B1 | * | 10/2001 | Rumpp ........................ 403/348 |
| 6,672,280 | B2 | * | 1/2004 | Price et al. .................. 123/337 |
| 6,733,045 | B2 | * | 5/2004 | Harrington et al. ...... 285/148.19 |
| 6,739,312 | B2 | * | 5/2004 | Komeda et al. ............. 123/337 |
| 6,848,628 | B2 | * | 2/2005 | Walker ........................ 239/16 |
| 7,219,652 | B2 | * | 5/2007 | Ino et al. .................... 123/337 |
| 7,302,930 | B1 | * | 12/2007 | Dudek ......................... 123/336 |
| 7,428,892 | B2 | * | 9/2008 | Isogai et al. ................. 123/399 |
| 7,552,710 | B2 | * | 6/2009 | Lancioni et al. ............. 123/336 |
| 2007/0079800 | A1 | * | 4/2007 | Fornara et al. .............. 123/306 |
| 2008/0236541 | A1 | * | 10/2008 | Tsukiji et al. ............... 123/337 |
| 2009/0159043 | A1 | * | 6/2009 | Asanuma et al. ............ 123/337 |

FOREIGN PATENT DOCUMENTS

AU         444864        1/1974

(Continued)

OTHER PUBLICATIONS

European Search Report dated Mar. 5, 2007 based on European Application No. EP06425679.

*Primary Examiner*—Hai H Huynh
(74) *Attorney, Agent, or Firm*—Ohlandt, Greeley, Ruggiero & Perle, L.L.P.

(57) ABSTRACT

A lock coupling between two mechanical components and presenting: at least one pair of coupling elements, each of which presents an "L"-shape and protrudes from a first mechanical component; and at least one pair of tracks, each of which is made through a second mechanical component, presents the shape of an arc of circumference, ends with a flared inlet opening, and is engaged in use by a coupling element; each track presents a dimension so as to prevent the axial removal of the coupling element along its entire length except for an inlet opening at which the coupling element can be axially removed.

7 Claims, 9 Drawing Sheets

FOREIGN PATENT DOCUMENTS

| | | |
|---|---|---|
| EP | 1264974 | 12/2002 |
| EP | 1571299 | 9/2005 |
| JP | 2002349378 | 12/2002 |
| JP | 2005127191 | 5/2005 |
| JP | 2006070720 | 3/2006 |

* cited by examiner

LOCK COUPLING BETWEEN TWO MECHANICAL COMPONENTS

CROSS REFERENCE TO RELATED APPLICATIONS

This application claims benefit under 35 U.S.C. §119(a) of European Patent Application No. 06425679/5 filed Oct. 5, 2006, the entire contents of which are incorporated herein by reference.

BACKGROUND OF THE INVENTION

1. Field of the Invention

The present invention relates to a lock coupling between two mechanical components. The present invention finds advantageous application in the coupling of mechanical components of an internal combustion engine, to which explicit reference will be made in the following description without for this loosing in generality.

2. Description of Related Art

In an internal combustion engine it is frequent the need to reciprocally couple two mechanical components by means of a lock coupling, i.e. by means of a coupling which allows a relative movement between the two mechanical components themselves (normally a reciprocal rotation about an axis of rotation) and prevents at the same time a distancing of the two components (i.e. a displacement along the axis of rotation).

Currently, a lock coupling between two mechanical components is carried out by using external coupling members (e.g. screws, bolts, Seeger rings, cotters etc.); however, using an external coupling member is not cost-effective because it implies costs linked to the purchase of the coupling member and costs linked to the assembly of the coupling member.

SUMMARY

It is the object of the present invention to provide a lock coupling between two mechanical components, which intake manifold is free from the drawbacks described above and, specifically, is easy and cost-effective to manufacture.

According to the present invention a lock coupling between two mechanical components is provided.

BRIEF DESCRIPTION OF THE SEVERAL VIEWS OF THE DRAWINGS

The present invention will now be described with reference to the accompanying drawings which illustrate a non-limitative example of embodiment thereof, in which.

DETAILED DESCRIPTION OF THE INVENTION

Figure 1:
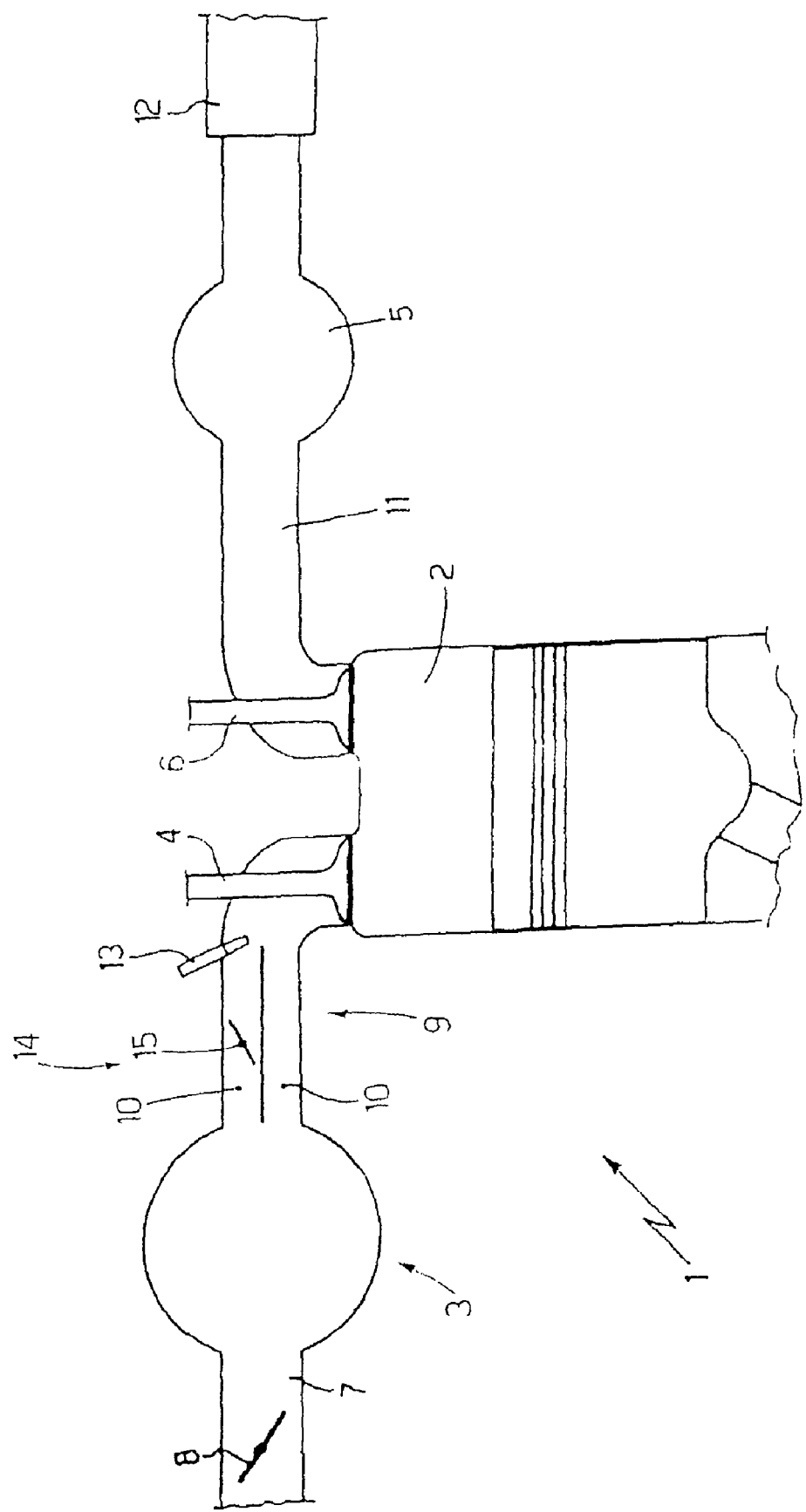
FIG. 1 is a schematic view of an internal combustion engine provided with a variable geometry intake manifold equipped with a lock coupling made according to the present invention.

In FIG. 1, numeral 1 indicates as a whole an internal combustion engine provided with four cylinders 2 (only one of which is shown in FIG. 1), each of which is connected to an intake manifold 3 by means of two intake valves 4 (only two of which are shown in FIG. 1) and an exhaust manifold 5 by means of two exhaust valves 6 (only one of which is shown in FIG. 1).

Intake manifold 3 receives fresh air (i.e. air from the external environment) through a feeding pipe 7 regulated by a butterfly valve 8 and is connected to cylinders 2 by means of corresponding intake pipes 9 (only one of which is shown in FIG. 1), each of which comprises two channels 10 (possibly of different length, shape and/or dimensions) and is regulated by corresponding intake valves 4. Similarly, exhaust manifold 5 is connected to cylinders 2 by means of respective exhaust conduits 11 (only one of which is shown in FIG. 1), each of which is regulated by corresponding exhaust valves 6; an emission pipe 12, which ends with a muffler (known and not shown) to emit the gases produced by combustion into the atmosphere departs from exhaust manifold 5.

According to a preferred embodiment, the fuel (e.g. petrol, diesel, methane or LPG) is injected within each intake pipe 9, by means of a corresponding injector 13 arranged near corresponding intake valves 4. According to a different embodiment (not shown), injectors 13 are arranged so as to directly inject the fuel within each cylinder 2.

Intake manifold 3 is a variable geometry manifold and comprises a choking system 14, which is adapted to vary during the operation of engine 1 the introduction section of the air of intake pipes 9 according to the speed of engine 1 itself. According to the embodiment shown in FIG. 1, choking system 14 is of the swirl type and comprises for each intake pipe 9 a choke valve 15, which is mounted along one of the two channels 10 of intake pipe 9 and is adapted to vary the introduction section of the air through channel 10 itself; specifically, each choke valve 15 is mobile between an active (or choking) position, in which choke valve 15 reduces the introduction section of the air of intake pipe 9 by completely closing corresponding channel 10, and a home (or maximum opening) position, in which choke valve 15 does not determine a significant reduction of the introduction section of the air of intake pipe 9.

Figure 2:
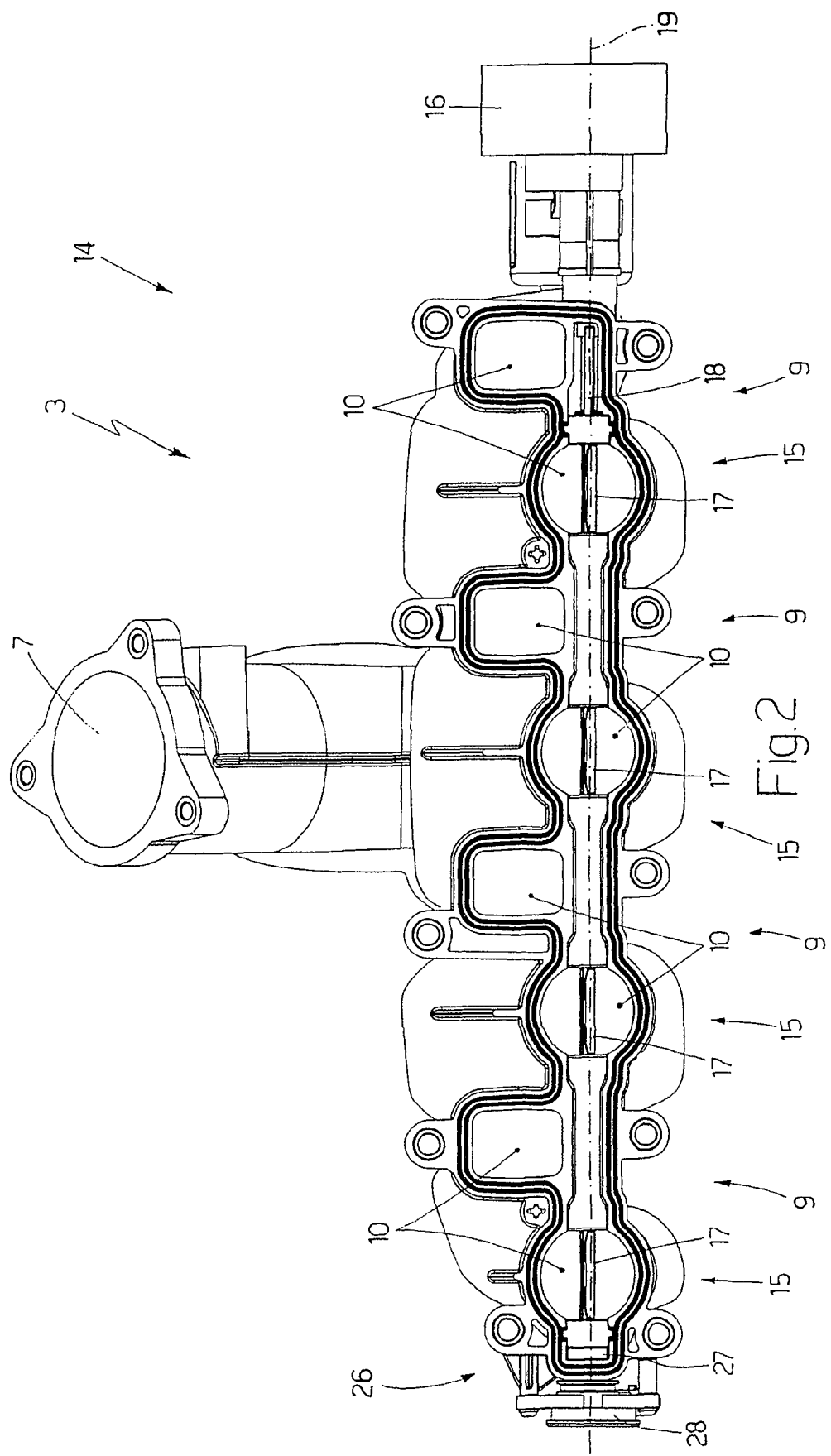
FIG. 2 is a front view of the intake manifold in FIG. 1 with parts removed for clarity.

According to that shown in FIG. 2, the four choke valves 15 are aligned and actuated by a common actuator device 16 (preferably provided with an electrical motor) arranged laterally with respect to intake manifold 3 and aligned with the four choke valves 15. Each choke valve 15 comprises a choking body 17, specifically a butterfly valve plate 17 (better shown in FIG. 3), which is keyed to a common shaft 18 (i.e. shared by all four choke valves 15) so as to turn with common shaft 18 itself about an axis of rotation 19 and under the bias of actuator device 16 between the active position and the home position.

Figure 3:
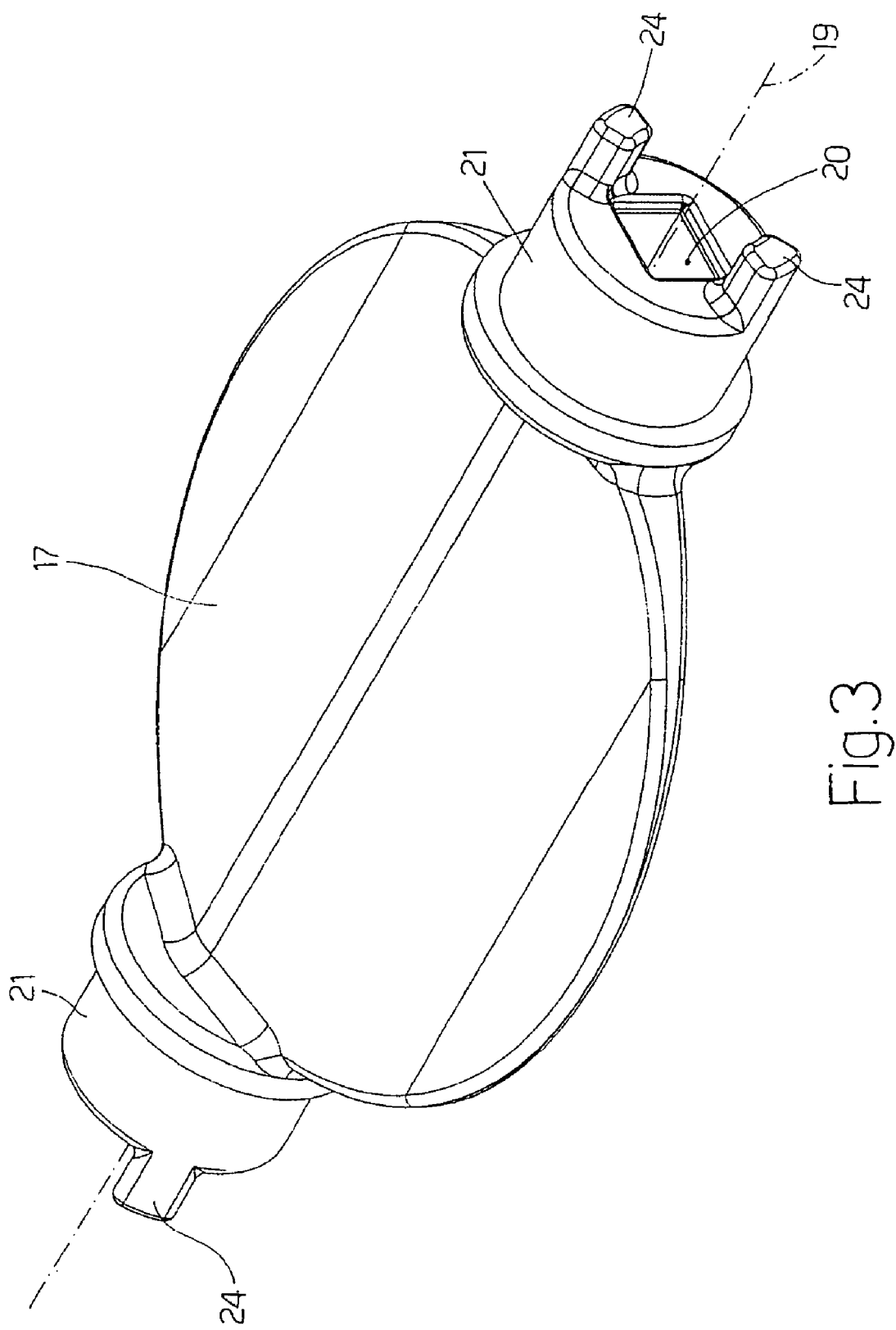
FIG. 3 is a perspective view of a butterfly valve plate of a choke valve of the choking system in FIG. 1.

According to a preferred embodiment shown in FIG. 3, each butterfly valve plate 17 presents a central through hole 20 and a square section within which common shaft 18 is inserted; the square section of hole 20 allows to render butterfly valve plate 17 angularly integral with shaft 18 by means of geometric interference and therefore without the need for further mechanical adjustments. Furthermore, on the opposite sides of each butterfly valve plate 17 and coaxially to through hole 20 are obtained two cylindrical expansions 21, which are inserted in respective cylindrical seats 22 (one of which is shown in FIG. 4) obtained in a valve body of choke valve 15 to define some bearings which guide the rotation of butterfly valve plate 17 about axis of rotation 19.

In use, each butterfly valve plate 17 turns under the bias of actuator device 16 between the active position (shown in FIG. 5), in which the introduction section of the air of intake pipe 9 is reduced, and the home position (shown in FIG. 6), in which the introduction section of the air of intake pipe 9 is not appreciably reduced.

Figure 4:
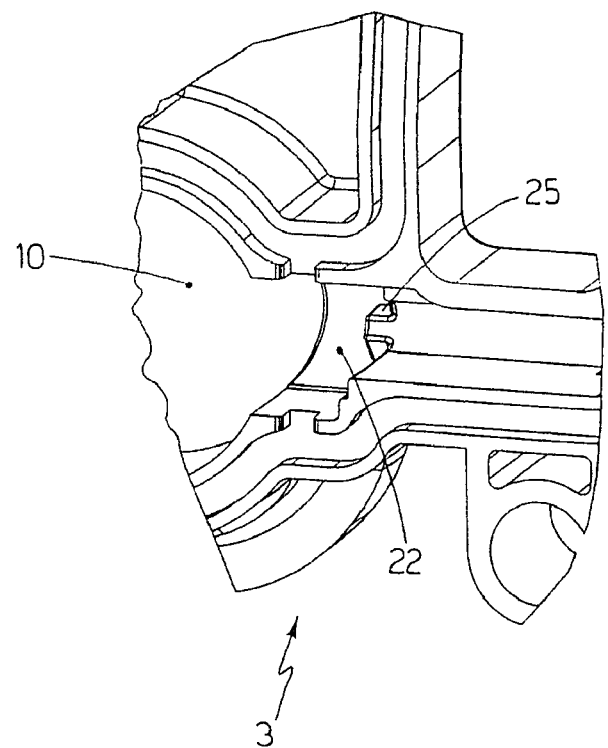
FIG. 4 is a perspective view of a valve seat of a choke valve of the choking system in FIG. 1 with parts removed for clarity.
Figure 5:
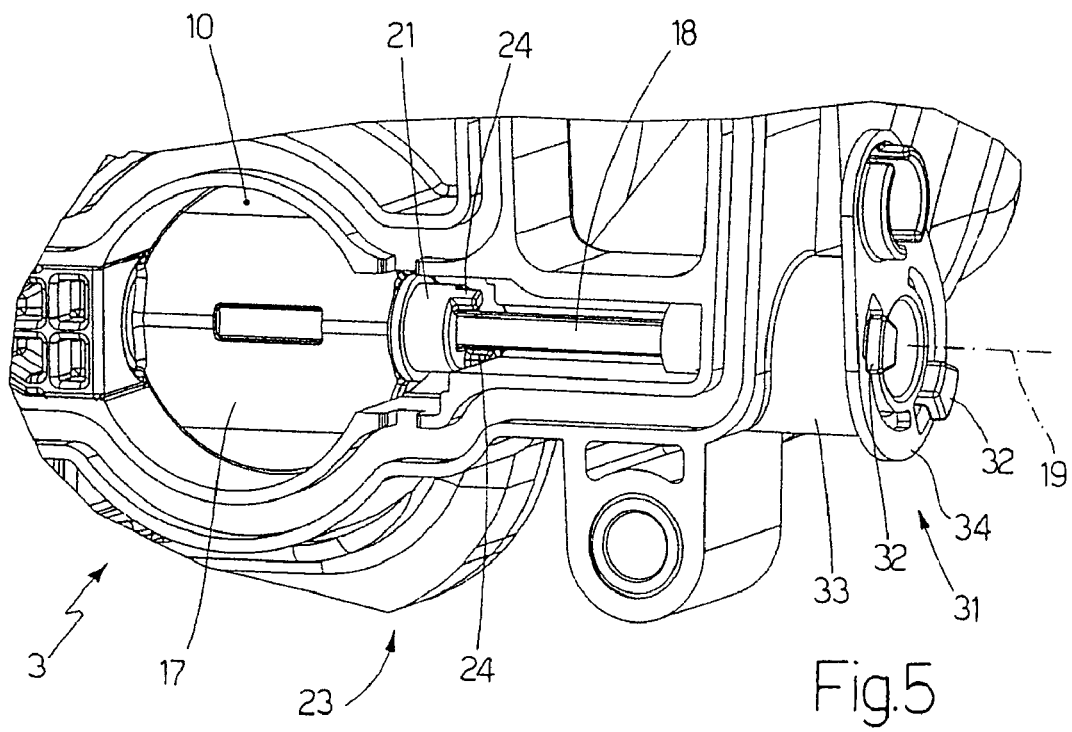
FIG. 5 is a perspective view of a choke valve of the choking system in FIG. 1 in an active or choke position with parts removed for clarity.
Figure 6:
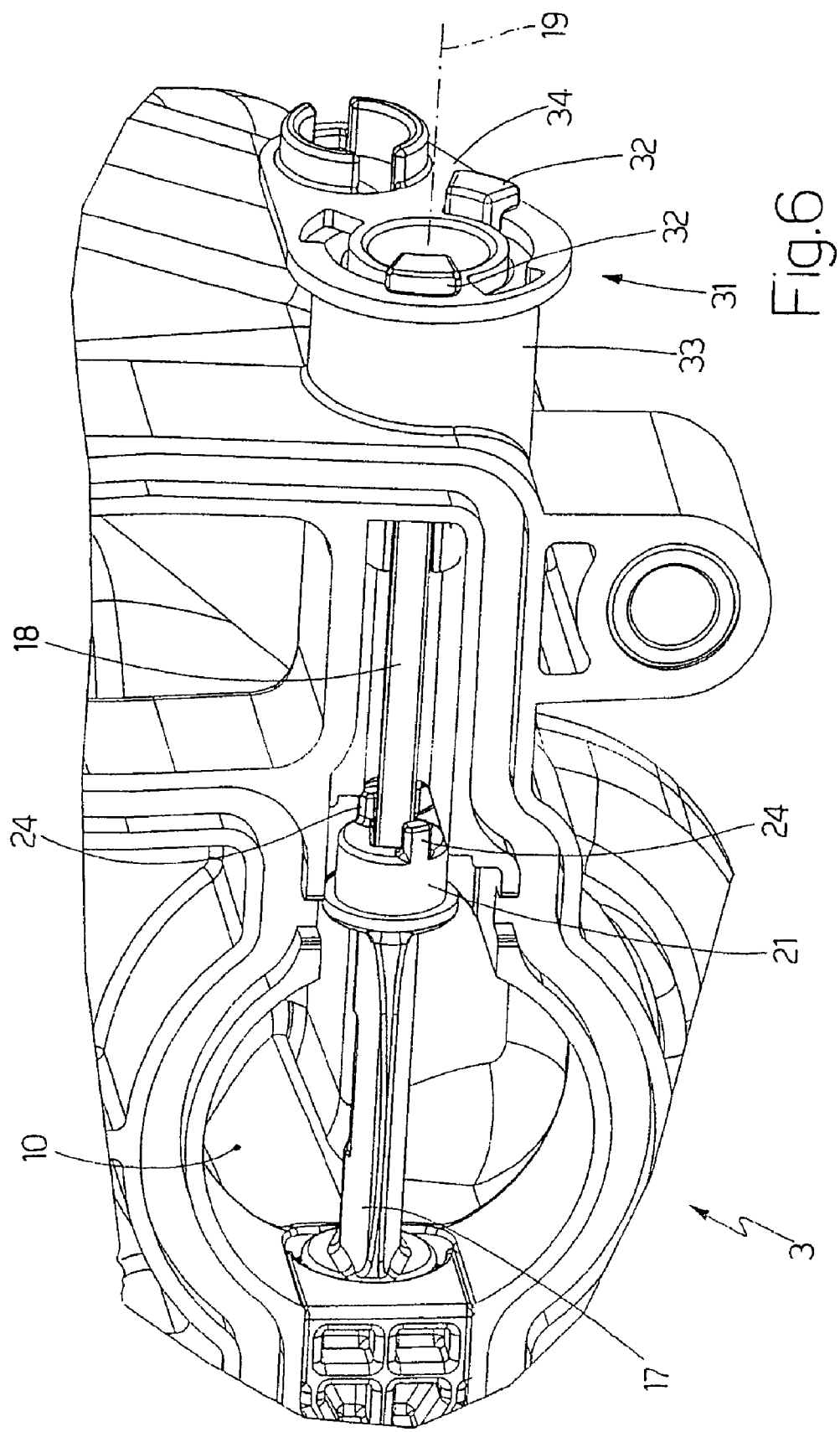
FIG. 6 is a perspective view of a choke valve of the choking system in FIG. 1 in a home or maximum opening position with parts removed for clarity.

As shown in FIGS. 3, 4 and 5, each choke valve 15 integrates within itself a pair of mechanical stoppers 23, which respectively determine the location of the active position and of the home position. Each stopper 23 comprises an abutment tooth 24, which is mobile, is arranged parallel and staggered with respect to axis of rotation 19, and is integral with butterfly valve plate 17, and a matching element 25, which is fixed, is integral with a fixed valve body of choke valve 15, and is arranged along the trajectory of movement of corresponding abutment tooth 24 to stop the movement of corresponding abutment tooth 24 and therefore of butterfly valve plate 17. Preferably, abutment teeth 24 rise from cylindrical expansion 21 and therefore matching elements 25 are obtained within a cylindrical seat 22. Furthermore, both matching elements 25 preferably consist of a single circular crown portion obtained within a cylindrical seat 22.

According to a preferred embodiment, each choke valve 15 integrates within itself only one pair of mechanical stoppers 23 arranged at one of the two cylindrical expansions 21 of butterfly valve plate 17. According to a different embodiment (not shown), each choke valve 15 integrates therein two pairs of mechanical stoppers 23 arranged at both of the two cylindrical expansions 21 of butterfly valve plate 17. According to a further embodiment (not shown), only one of the four choke valves 15 integrates a pair of mechanical stoppers 23; however, this embodiment implies higher manufacturing costs because it obliges to produce two different types of butterfly valve plates 17 (with abutment teeth 24 and without abutment teeth 24).

According to a different embodiment (not shown), choking system 14 is of the tumble type; in this case, each intake pipe 9 comprises a single channel 10 in which is arranged a choke valve mobile between the active (or choking) position, in which choke valve 15 reduces the introduction section of the air of intake pipe 9, and a home (or maximum opening) position, in which choke valve does not determine any reduction of the introduction section of air of intake pipe 9.

According to a further embodiment (not shown), choking system 14 is of the PDA (Port De-Activation) type.

Choking system 15 described above is at the same time both simple and cost-effective to manufacture, and particularly precise and compliant to design specifications. Such results are obtained by integrating mechanical stoppers 23 within choke valves 15 and specifically by integrating mechanical stoppers 23 in butterfly valve plates 17. In this way, also with a not particularly precise (and therefore simple and cost-effective) construction method, it is possible to establish the actual location of the active and the home positions with sufficient precision.

Figure 7:
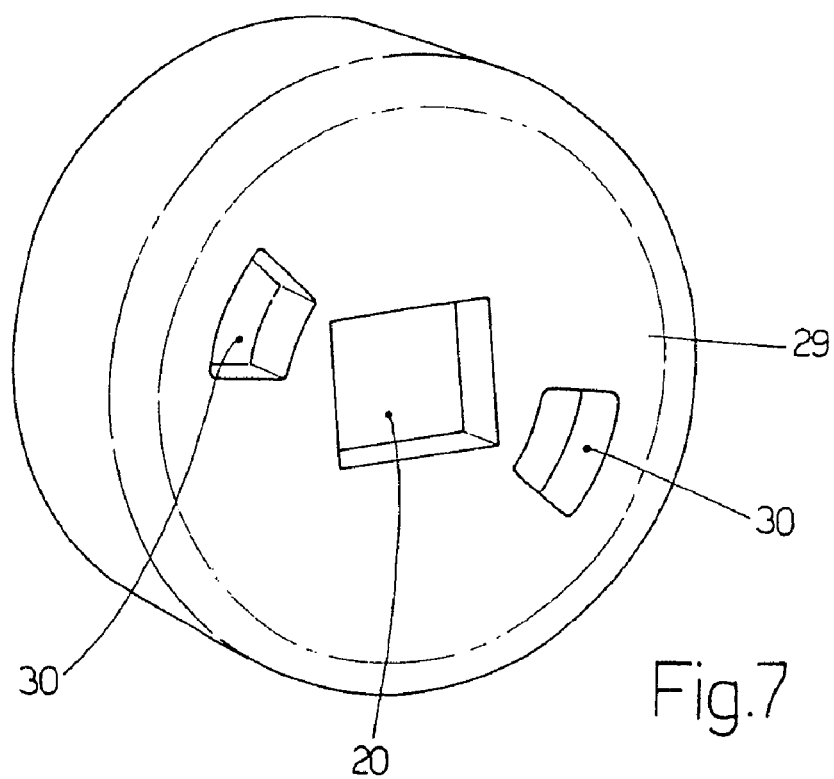
FIGS. 7 and 8 are different perspective views of a rotor of an angular position sensor of the choking system in FIG. 1.
Figure 8:
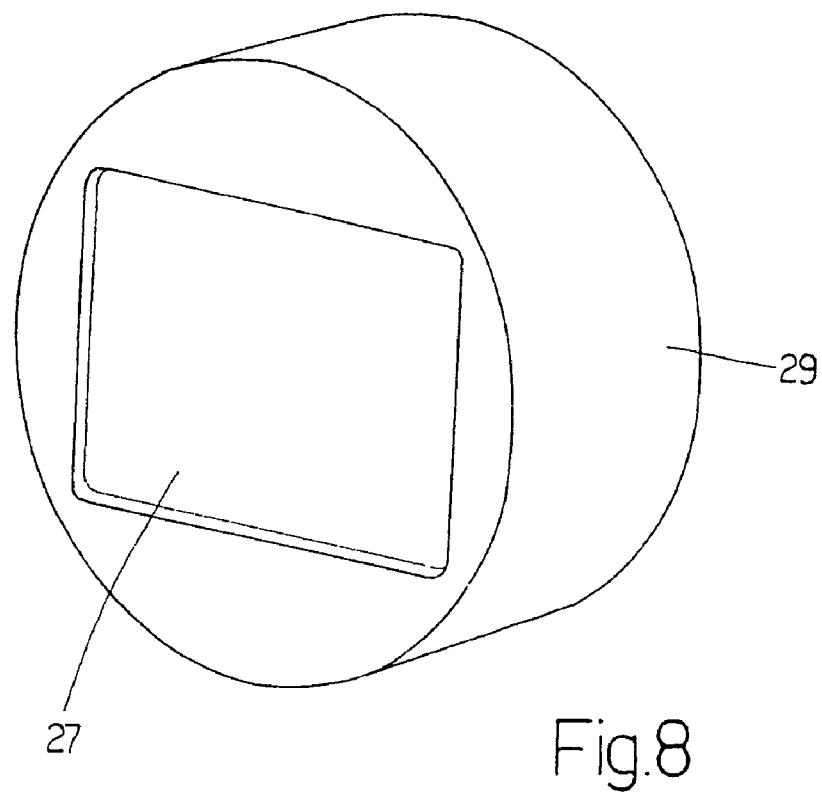
Figure 9:
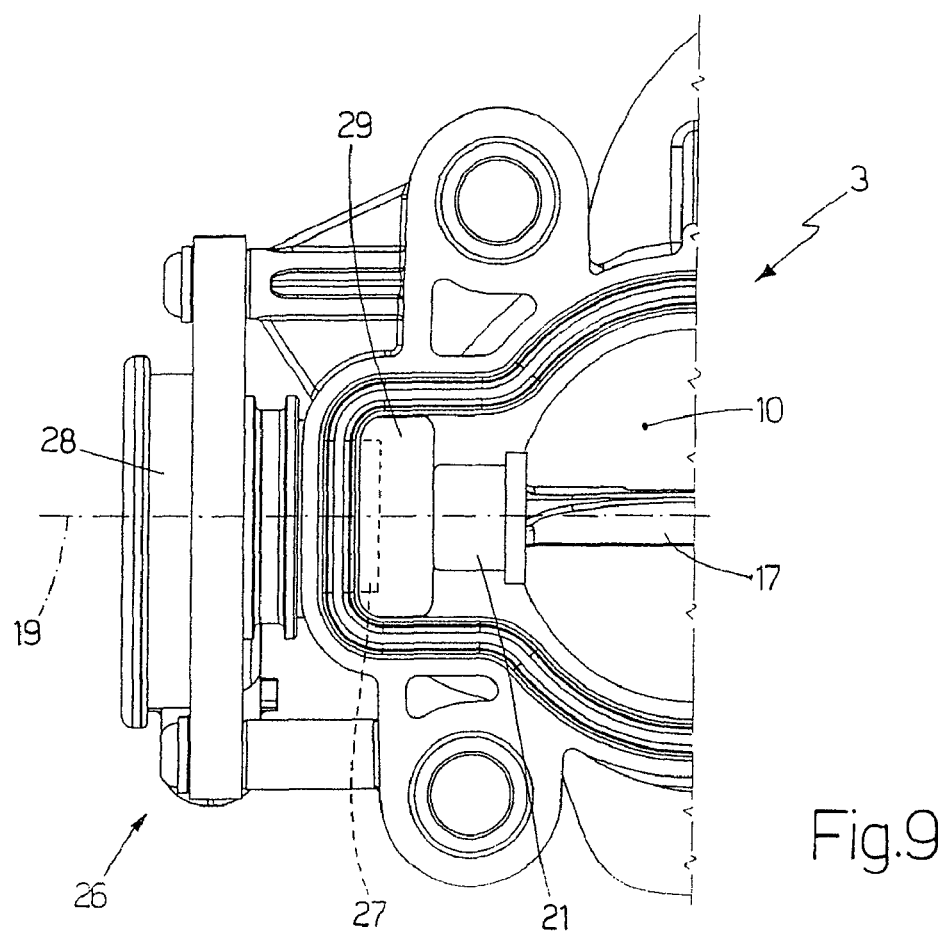
FIG. 9 is a front view of an angular position sensor of the choking system in FIG. 1 with parts removed for clarity.
Figure 10:
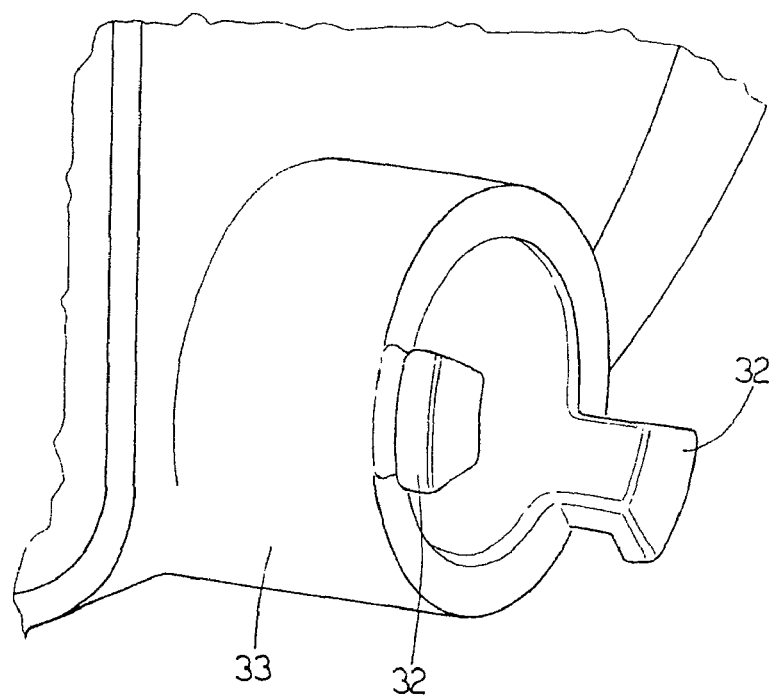
FIG. 10 is a perspective view of a fixed element of a mechanical coupling between a shaft of the choke valves of the choking system in FIG. 1 and a shaft of an actuator device of the choking system in FIG. 1.
Figure 11:
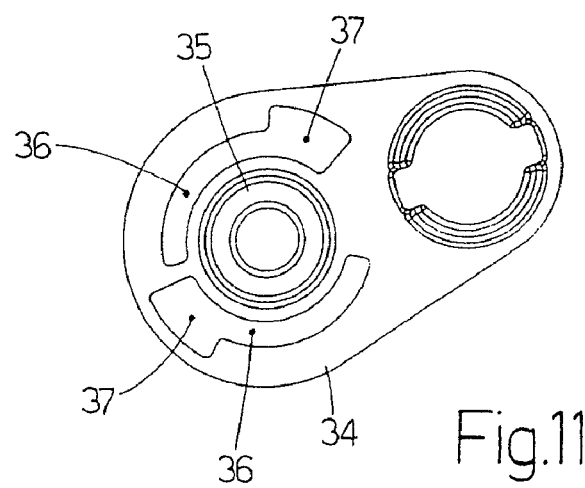
FIG. 11 is a plan view of a mobile element of the mechanical coupling in FIG. 10.

According to that shown in FIGS. 7, 8 and 9, choking system 14 comprises an angular position sensor 26 coupled to an end of common shaft 18 and arranged on opposite band with respect to actuator device 16 to determine the angular position of common shaft 18 about axis of rotation 19. It is important to observe that position sensor 26 is coupled to the farthest choke valve 15 from actuator device, because such choke valve 15 is arranged in the last place of the mechanical transmission which transmits the motion from actuator device 16 and therefore is the most subject to possible mechanical problems.

Angular position sensor 26 comprises a square-section permanent magnet 27 integral with common shaft 18, and a reader 28, which is of the magneto-resistive type, is adapted to read the orientation of permanent magnet 27, and is arranged outside intake pipe 9 near a wall of intake pipe 9 itself and near permanent magnet 27. Preferably, permanent magnet 27 is embedded (preferably by co-moulding) in a cylindrical cradle 29, which is coupled to butterfly valve plate 17 of choke valve 15; for this purpose, cylindrical cradle 29 presents a pair of holes 30, which are adapted to be engaged by abutment teeth 24 of butterfly valve plate 17 which in this case are not used as part of a stopper, but as mechanical coupling members for cradle 29.

The use of angular position sensor 26 described above has a number of advantages, because such angular position sensor 26 is cost-effective, easy and fast to assemble and presents a high measuring precision. Specifically, the assembly of angular position sensor 26 is easy and fast because reader 28 of angular position sensor 26 is arranged outside intake pipe 9 and therefore no type of perforation of intake pipe 9 is required; furthermore, checking, maintaining or replacing reader 28 of angular sensor 26 is simple and immediate also when intake manifold 3 is mounted in engine 1.

Angular position sensor 26 described above does not introduce any type of friction on the rotation of common shaft 18 because reader 28 of angular position sensor 26 is of the contactless type and therefore is mechanically independent from permanent magnet 24 and because it does not require the presence of any dynamic or static seal ring coupled to common shaft 18.

Finally, angular position sensor 26 described above directly detects the actual position of butterfly valve plates 17 and is capable of detecting if a butterfly valve plate 17 no longer receives the motion from actuator device 16 because of a mechanical problem.

According to that shown in FIG. 2, a drive shaft (not shown) of actuator device 16 is coaxial with axis of rotation 19 (i.e. with common shaft 18) and consequently is directly head-linked to common shaft 18 without interposition of mechanical transmissions which vary the transmission ratio.

According to that shown in FIGS. 10-14, in order to maintain common shaft 18 in the correct axial position a lock coupling 31 (shown in FIGS. 12-14) is contemplated which maintains common shaft 18 within intake manifold 3.

The lock coupling 31 comprises a pair of coupling elements 32, each of which presents an "L"-shape and protrudes from an outer tubular body 33 of intake manifold 3. Furthermore, lock coupling 31 comprises a plate 34, which centrally presents a central cup 35 which presses on the end of common shaft 18 to maintain common shaft 18 itself in the correct axial position within intake manifold 3. Plate 34 further presents a pair of tracks 36, each of which presents the shape of an arc of circumference, is arranged about central cup 35, ends with a flared inlet opening 37, and is engaged in use by a coupling element 32. Specifically, each track 36 presents a dimension so as to prevent the axial removal of coupling element 32 along its entire length except for the input opening 37 at which coupling element 32 may be axially inserted or removed.

Figure 12:
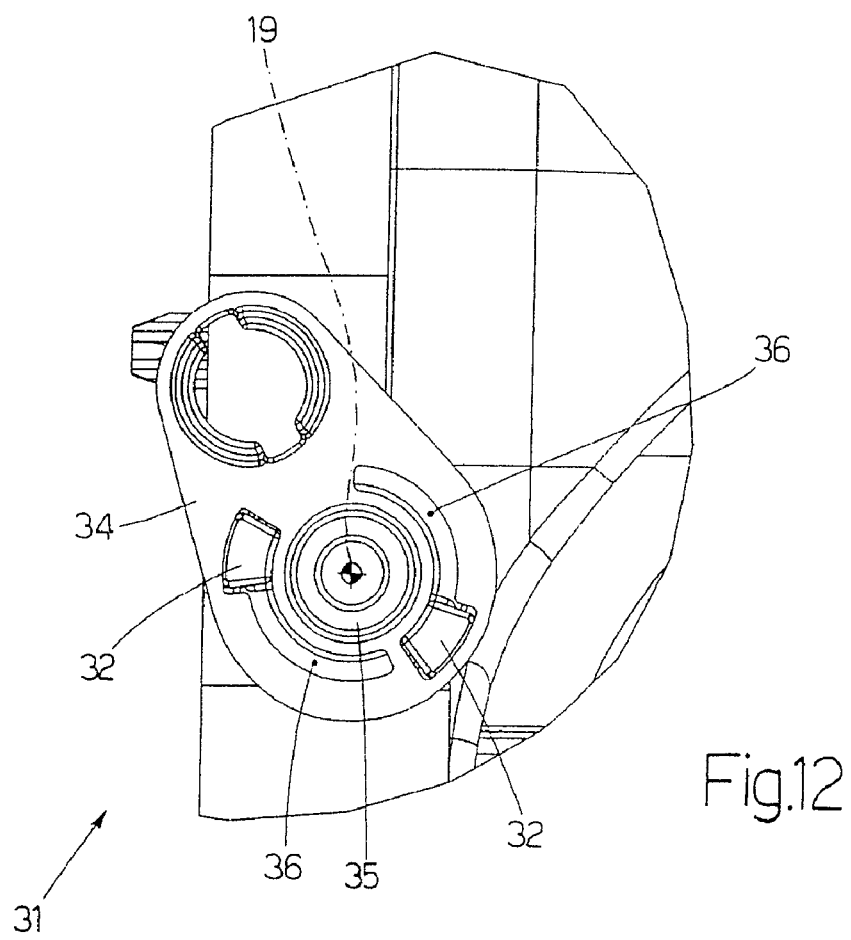
FIGS. 12, 13 and 14 are frontal views of the mechanical coupling in FIG. 10 respectively in an assembly position, in a working position corresponding to an active or choking position of the choke valves, and a working position corresponding to a home or maximum opening position of the choke valves.
Figure 13:
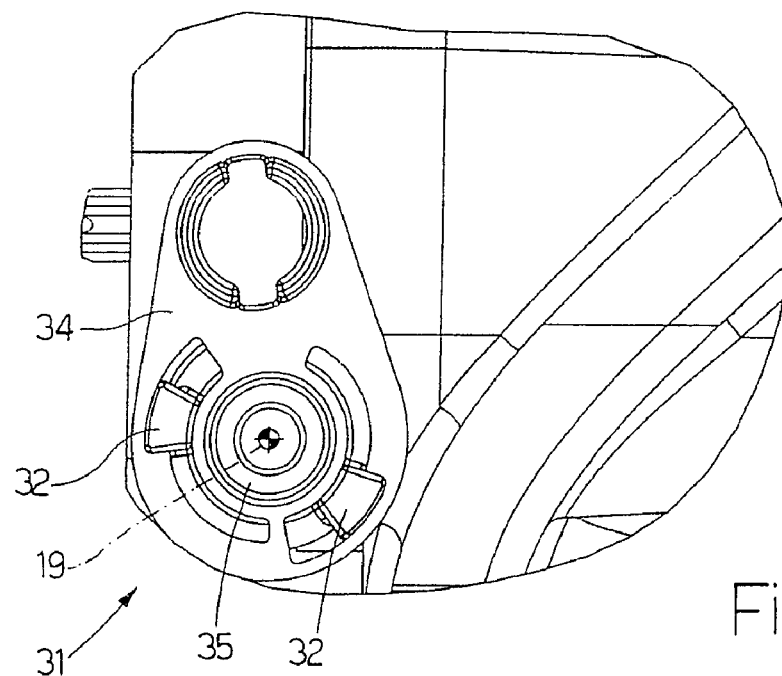
Figure 14:
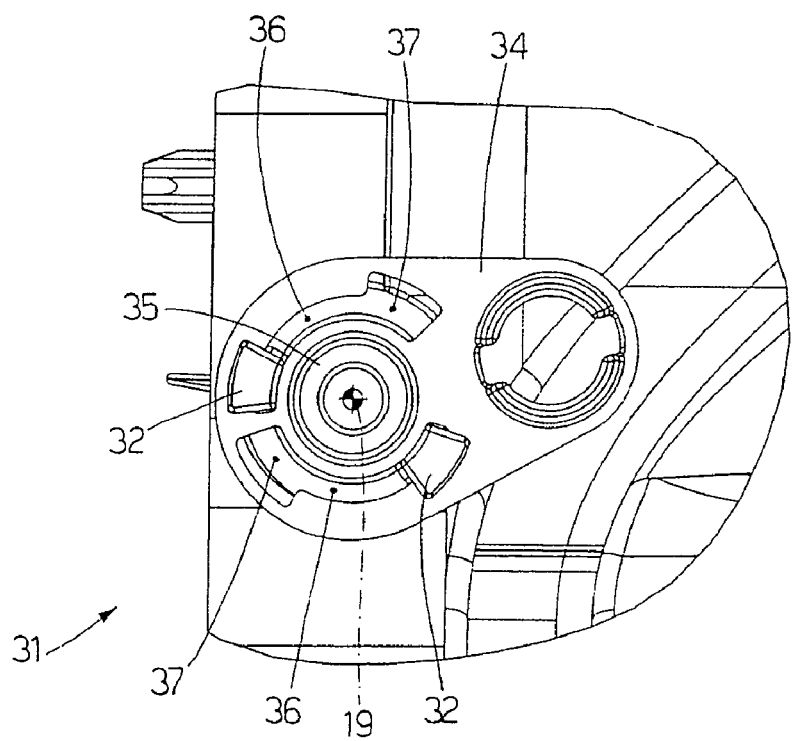

During the assembly of plate 34, plate 34 itself is directed so as to make the position of inlet openings 37 coincide with the position of coupling elements 32; at this point, plate 34 itself may be coupled to outer body 33 of intake manifold 3 by inserting coupling elements 32 through inlet openings 37 (FIG. 12). Subsequently, plate 34 is turned with respect to outer body 33 of intake manifold 3 so as to distance coupling elements 32 from inlet openings 37 and, in use, plate 34 is no longer returned to the assembly position in which the position of inlet openings 37 coincides with the position of coupling elements 32 (FIGS. 13 and 14).

In other words, during normal operation when plate 34 turns along with common shaft 18, coupling elements 32 of outer body 33 slide along tracks 36 without ever reaching the assembly position in which the position of inlet openings 37 coincides with the position of coupling elements 32. FIG. 13 shows the position of plate 34 when choke valves 15 are arranged in active or closed position, while FIG. 13 shows the position of plate 34 when choke valve 15 are arranged in home or maximum opening position.

According to a preferred embodiment, plate 34 is used as actuating lever of common shaft 18, i.e. as power take-off for turning common shaft 18 about axis of rotation 19. In other words, actuator device 16 transmits motion to common shaft 18 by means of plate 34 which acts as actuating lever. For this purpose, plate 34 is keyed to an end of common shaft 19 by means of an appropriate coupling by shape between the end of common shaft 18 and central cup 35 of plate 34.

According to a different embodiment (not shown), lock coupling 31 comprises a higher number of sealing elements 32 (e.g. three or four).

Lock coupling 31 described above presents a number of advantages, because it is extremely simple and cost-effective to manufacture and to assemble; specifically, such lock coupling 31 allows to obtain a mechanical locking without the use of third mechanical members (e.g. screws, bolts, Seeger rings, cotters).

What is claimed is:

1. A lock coupling between a first mechanical component and a second mechanical component, comprising: at least one pair of coupling elements, each of which presents an "L"-shape and protrudes from the first mechanical component; and at least one pair of tracks, each of which is obtained through the second mechanical component, presents the shape of an arc of circumference, ends with a flared inlet opening, and is engaged in use by a coupling element, each track presents a dimension so as to prevent the axial removal of the coupling element along its entire length except for an inlet opening at which the coupling element may be axially removed, wherein the first mechanical component is an outer tubular body of an intake manifold containing a shaft revolving about an axis of rotation and the second mechanical element is a plate which acts as actuating lever of the shaft.

2. The lock coupling according to claim 1, wherein the plate centrally presents a central cup which presses on the end of the shaft to maintain the common shaft itself in the correct axial position within the intake manifold.

3. The lock coupling according to claim 2, wherein the central cup of the plate is rendered angularly integral with the end of the shaft by an appropriate coupling by shape.

4. A variable geometry intake manifold for an internal combustion engine, the intake manifold comprising: at least one intake pipe which connects the intake manifold to at least one cylinder of the internal combustion engine; a choking system for varying the geometry of the intake manifold and comprising at least one choke valve provided with a choking body, which is arranged within the intake pipe and is mounted on a shaft turnable about an axis of rotation; and a lock coupling maintaining the common shaft in the correct axial position, the lock coupling comprising: at least one pair of coupling elements, each of which presents an "L"-shape and protrudes from an outer tubular body of the intake manifold, and a plate presenting at least one pair of tracks, each of which presents the shape of an arc of circumference, ends with a flared inlet opening, and is engaged in use by a coupling element, each track presents a dimension so as to prevent the axial removal of the coupling element along its entire length except for an inlet opening at which the coupling element may be axially removed.

5. The intake manifold according to claim 4, wherein the plate centrally presents a central cup which presses on the end of the common shaft to maintain the common shaft itself in the correct axial position within the intake manifold.

6. The intake manifold according to claim 5, wherein the central cup of the plate is rendered angularly integral with the end of the common shaft by an appropriate coupling by shape.

7. The intake manifold according to claim 6, wherein the plate acts as actuating lever of the shaft.

* * * * *